UNITED STATES PATENT OFFICE.

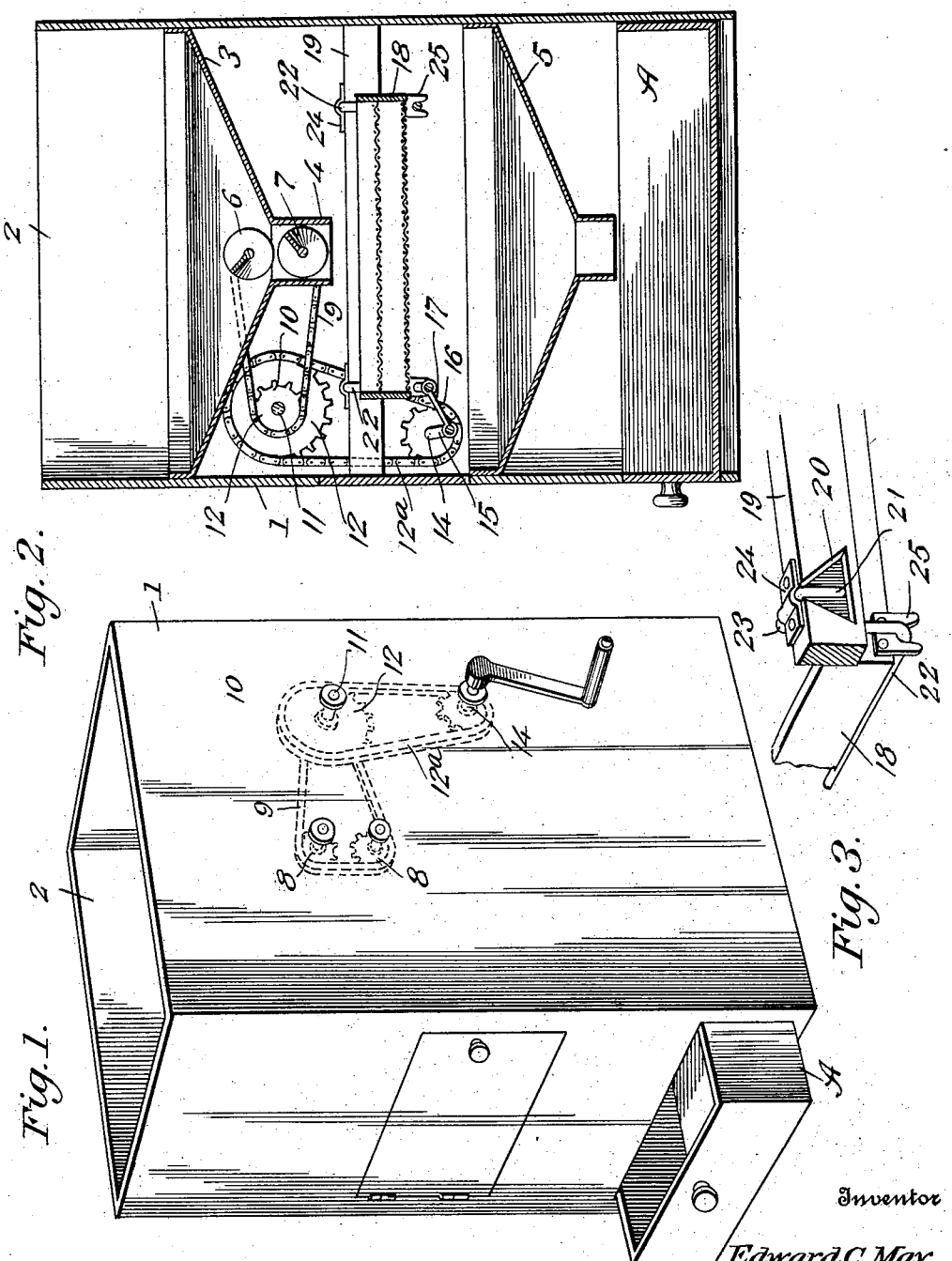

EDWARD C. MAY, OF WATERTOWN, WISCONSIN.

FLOUR-SIFTING MACHINE.

1,025,004. Specification of Letters Patent. Patented Apr. 30, 1912.

Application filed September 13, 1911. Serial No. 649,104.

*To all whom it may concern:*

Be it known that I, EDWARD C. MAY, a citizen of the United States, residing at Watertown, in the county of Jefferson and State of Wisconsin, have invented new and useful Improvements in Flour-Sifting Machines, of which the following is a specification.

This invention provides a device for general use in which flour, meal or the like may be stored and a quantity sifted when required for use in preparing food or for other purpose.

The invention relates more particularly to the means whereby the sifter is supported and mounted to have a vibratory and jarring movement imparted thereto so as to prevent sticking of the flour, and insure passage of the same through the meshes of the screen.
The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a perspective view of a flour sifter embodying the invention. Fig. 2 is a sectional view thereof.
Fig. 3 is a detail view, showing more clearly the means for supporting the sifter.

Corresponding and like parts are referred to in the following description, and indicated in all the views of the drawing, by the same reference characters.

The appliance comprises a casing 1, the upper portion being partitioned to form a bin 2 in which is placed the flour, meal or the like for storage. The lower portion of the casing is adapted to receive a drawer A, or other receptacle, for catching the flour or meal as the same is sifted. The middle part of the casing contains the sifter and the operating means. The partition 3 forms the bottom of the hopper and comprises parts which slope to an opening from which depends a spout 4. A partition 5 separates the sifting compartment from the lower space of the casing and comprises parts which slope to a central opening through which the flour or meal escapes. Spiral agitators 6 and 7 are located in the lower portion of the hopper and in the spout 4 and consist of flat strips twisted into spiral form, the one being right and the other left. The parts 6 and 7 serve to agitate the material and to insure a positive feed thereof through the spout 4 and at the same time to loosen and lighten the material prior to its delivery to the sifter. The shafts of the agitators 6 and 7 are provided with sprocket wheels 8 around which passes a sprocket chain 9 which makes connection with a sprocket wheel 10 secured to a shaft 11, which is mounted at its ends in opposite walls of the casing 1. A sprocket wheel 12 secured to an end of the shaft 11 is connected by a sprocket chain 12ª with a sprocket wheel 13 on the outer end of a shaft 14, which parallels the shaft 11 and is mounted in opposite walls of the casing 1. A crank 15 in the length of the shaft 14 is connected by means of a pitman 17 with the frame 18 of the sifter. Strips 19 are located upon the inner sides of opposite walls of the casing 1 and are formed in their upper sides with downwardly flared recesses 20 in which operate bent ends 21 of bails 22, which support the frame 18 in a manner to admit of said frame having a vibratory movement imparted thereto. The frame 18 is supplied with two bails 22 each formed of stout wire bent into substantially U form and having the end portions of their side members bent outwardly, as indicated at 23, to form journals which are mounted in strap irons 24 applied to the strips 19, the outer ends of the journals 23 being bent to form the parts 21. There is a limited play between the pitman 15 and the parts 15 and 18 to admit of the bent ends 21 of the bails striking the inclined walls of the recesses 20 so as to suddenly arrest the movement of the sieve in each direction, whereby a jar is produced to insure positive delivery of the flour or meal through the meshes of the screen. One or more screens are located within the frame 18 to effect a sifting of the flour or meal in the operation of the device. The sifter is removable from the casing and is supported on the horizontal portions of the bails 22 by notched lugs 25 attached to the frame 18.

The flour or meal is stored in the compartment or bin 2 of the casing and when it is required to obtain a portion a receptacle is placed in the lower part of the casing in line with the opening in the partition 5, after which the shaft 11 is rotated by means of a crank 25 fitted thereto. The flour is positively fed and at the same time loosened and lightened by means of the agitators 6 and 7. The flour received upon the uppermost screen of the sieve is caused to pass through the sieve by the vibratory movement imparted thereto, the discharge being facilitated by the jarring motion imparted to the sieve by the bent ends 21 of the suspending means striking the walls of the recesses 20.

It is to be understood that this invention provides a device for general use in which flour, meal or the like may be sifted when required for use in any way.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

The device is intended chiefly for use by bakers and flour and feed dealers, since it provides a machine capable of storing flour or meal in bulk and admitting of a portion being sifted when required either to supply the needs of a customer or for use by the possessor of the machine. It is to be understood, however, that the machine may be adapted for household use by constructing the same of proper and convenient size.

Having thus described the invention what is claimed as new, is:—

1. In a flour sifter the combination of a frame provided with a screen, supports having flared recesses, suspending means for the frame having journals mounted upon the strips and having parts pendent from the journals which enter the flared recesses and engage opposite walls thereof to impart a jar to the sieve at the end of its movement in each direction, and means for imparting vibratory movement to the sieve.

2. A flour sifter comprising a frame, strips for supporting the frame having flared recesses, bails of substantially U form supporting the sifter and having journals at the upper ends of their side members extending over the recesses in the strips and supporting the screen, the journals of the bails having pendent portions to enter the flared recesses and engage with the walls thereof, and means for imparting a vibratory movement to the sifter.

In testimony whereof I affix my signature in presence of two witnesses.

EDWARD C. MAY.

Witnesses:
S. E. HOLMES,
O. C. HAHN.

---

Copies of this patent may be obtained for five cents each, by addressing the "Commissioner of Patents, Washington, D. C."